UNITED STATES PATENT OFFICE.

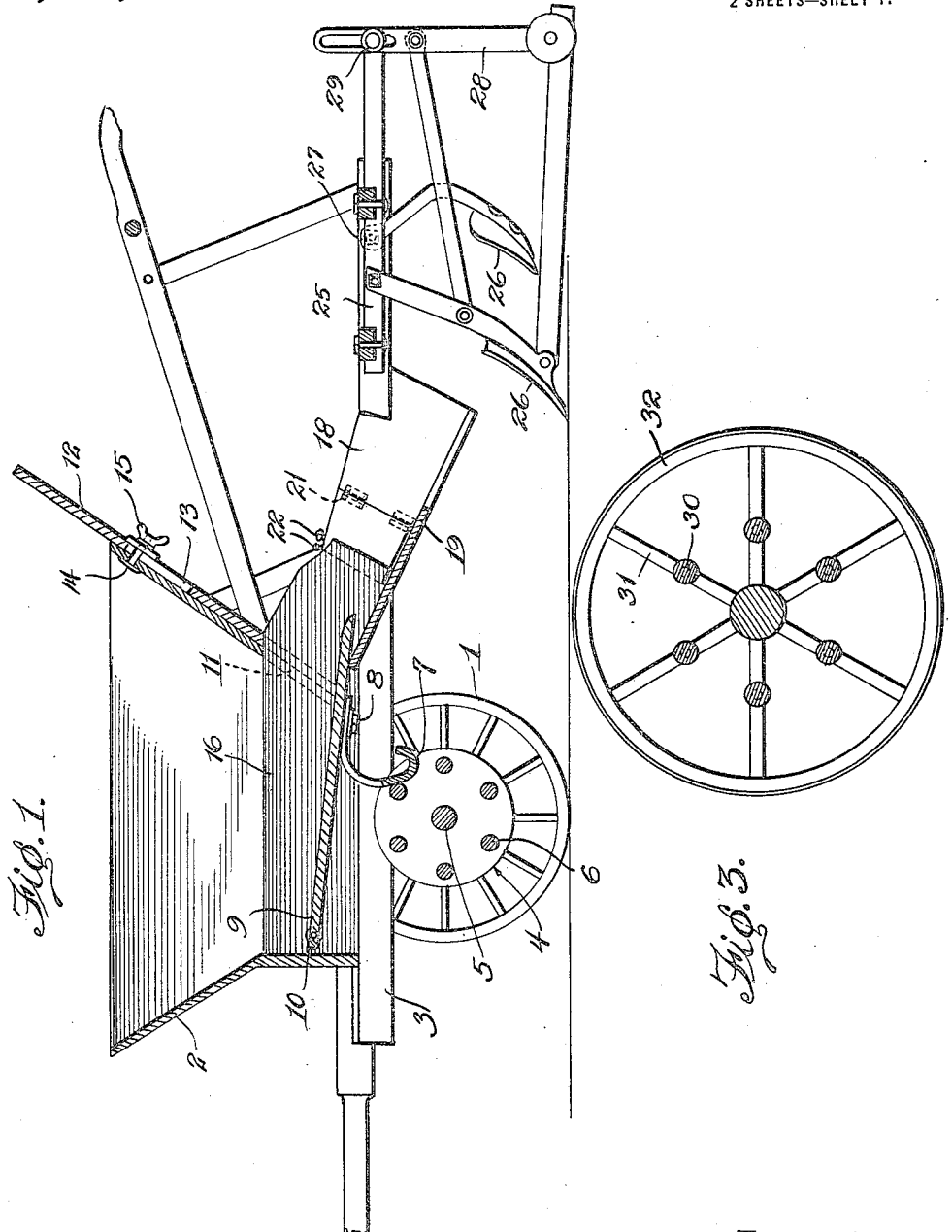

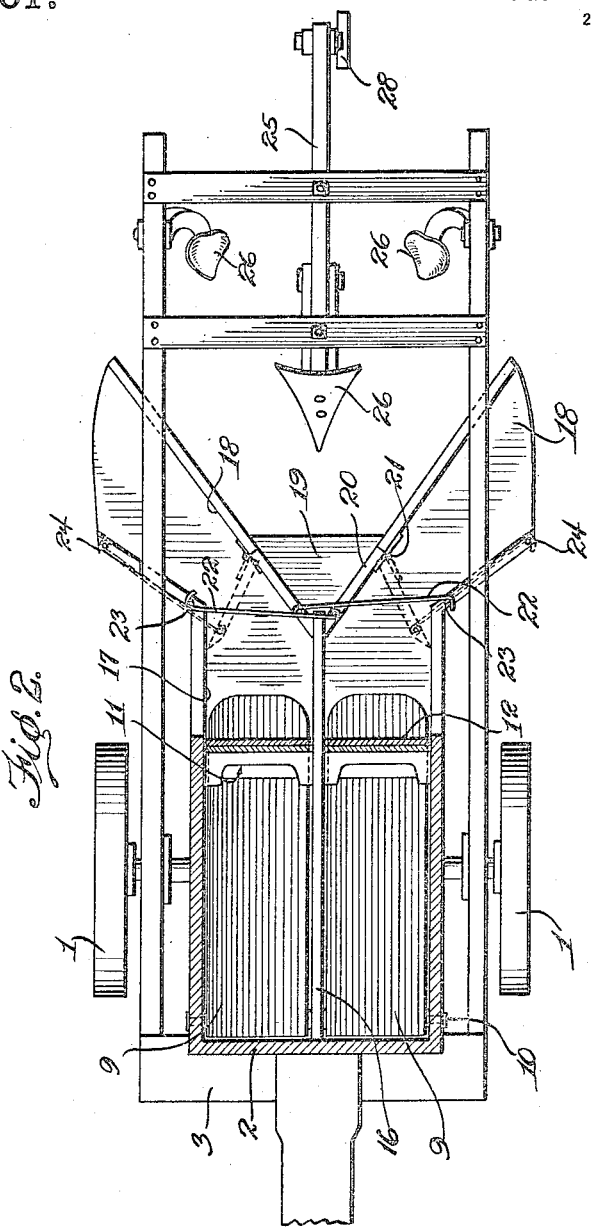

MAXIE DIXSON TURBEVILLE, OF LAKE CITY, SOUTH CAROLINA, ASSIGNOR OF ONE-HALF TO ASHTON H. WILLIAMS, OF LAKE CITY, SOUTH CAROLINA.

FERTILIZER-DISTRIBUTER.

1,227,701. Specification of Letters Patent. Patented May 29, 1917.

Application filed March 11, 1916. Serial No. 83,603.

*To all whom it may concern:*

Be it known that I, MAXIE DIXSON TURBEVILLE, a citizen of the United States, residing at Lake City, in the county of Florence and State of South Carolina, have invented certain new and useful Improvements in Fertilizer-Distributers, of which the following is a specification.

My invention relates to fertilizer distributers of that class in which a vibrating plate or bar forming the bottom of the hopper is actuated by tappet mechanism to feed the fertilizer, by gravity, from the hopper to the ground.

A further object of the invention is to mount the vibrating feeder-plate so as to insure a thorough and effective feed, the tappet mechanism being conjointly used as a brace for the supporting wheels.

Another object of the invention is to provide an arrangement whereby the fertilizer may be discharged either centrally or laterally, in whole or in part, without materially rearranging the component parts.

A further object of the invention resides in the provision of a device or machine having means thereon for the adjustment of the dropping or distributing mechanism whereby more or less of the fertilizing material may be distributed as the device is propelled.

A still further object of the invention is to provide a means for covering the freshly dropped material in order that none of its fertilizing properties will be nullified by undue exposure to the atmosphere.

The above and additional objects are accomplished by such means as are illustrated in their preferred embodiment in the accompanying drawings, described in the following specification and then more particularly pointed out in the claims which are appended hereto and form a part of this application.

In describing my invention in detail, reference will be had to the accompanying drawings wherein like characters denote like and corresponding parts throughout the several views, and in which:—

Figure 1 is a longitudinal sectional view of my improved fertilizer distributing machine;

Fig. 2 is a plan view, the hopper and its associate mechanism being shown in section; and Fig. 3 is a detail section of a modified form of tappet wheel.

Before proceeding with the description of the drawings, I desire to call particular attention to the fact that while I have evolved my invention with reference to its use as a fertilizer distributer, the same, if desired, may be used as a planter and cultivator—its uses being hereinafter more particularly described.

Referring now to the drawings, numerals 1—1 designate the supporting wheels, 2 the hopper, 3 the main frame of the machine, 4 as an entirety the tappet mechanism, and 5 the wheel axle upon which said mechanism 4 is mounted to revolve.

The hopper 2, as illustrated to advantage in Fig. 1, is mounted to rest upon the main frame 3 directly over the axle 5. Through such an arrangement, it is evident that the tappet mechanism 4 will operate in proximity to the bottom of the hopper, thus causing the tappet pins, designated 6 to successively engage with an arm or extension 7 secured as at 8 to the under side of a vibratory feeder-plate 9, the latter, said plate 9 having pivotal connection as indicated at 10 to and between the hopper sides at the forward end thereof.

An opening 11 is formed in the hopper 2 so that the fertilizing material contained therein may gravitate therethrough, it being evident upon reference to Fig. 1 that the feeder-plate 9 is set at an inclination with its pivoted end uppermost. In order that the size of the opening may be varied to regulate the quantity of fertilizer issuing therethrough, I provide an adjustable feed-regulating plate 12. Said plate 12 is preferably located contiguous to the outside surface of the rear end of the hopper 2, an opening 13 being formed in said plate, so that a fastening bolt 14, rigid with the hopper, may pass therethrough. Said bolt 14 is equipped with a thumb nut 15 operable to release and lock said plate 12.

A partition 16 is mounted to divide the hopper at its base into duplicate discharge channels 17, the respective channels extending longitudinally of the machine frame, each terminating in a lateral discharge chute 18 so that the fertilizing material may be directed to either or both sides of the machine. The discharge chutes 18 extend in divergent relation as indicated in Fig. 2. The bottom 19 of each channel 17 is extended as indicated at 19' to permit of a central discharge, if desired.

Gates 20, in the nature of flap-valves are hinged as at 21, one at the inner elevated end of each chute, 18, said gates being movable from the position indicated in full lines in Fig. 2 to the position indicated in dotted lines in said figure whereby a discharge of the fertilizing material may be via the chutes 18 or the extension 19' as the occasion demands. Each valve or gate 20 is equipped with a hook device 22 which serves in the capacity of a lock. Said hooks when in engagement with pins 23, will lock the gates in a position permitting of a lateral discharge, and when in engagement with the pins 24, permitting of a central discharge.

The rear end of the main frame 3 is somewhat extended as indicated at 25 to afford a support for a plurality of shovels 26 mounted to operate respectively directly behind the central discharge point 19 and at each side thereof, the side shovels having connection with the extension 25 as indicated at 27, said shovels conjointly operated to effectually cover the fertilizing material that its fertilizing properties may not be lost by exposure.

As a brace and support for the center shovel 26, I provide a suitable frame 28, said frame being adjustable as indicated at 29 with respect to the main frame 3.

Coming now to a description of the modification illustrated in Fig. 3, it will be observed that the tappet pins 30 therein illustrated, connect the spokes 31 of the supporting wheels 32, said pins being thus conjunctively utilizable as a brace for said wheels and as a mechanism for operative association with the angle arm of the feeder plate 9.

From the foregoing taken in connection with the accompanying drawings, it is evident that the fertilizer may be distributed either centrally or laterally without materially rearranging the parts; that the quantity of fertilizer thus distributed may be varied through adjustment of the feed regulating plate 12; and that by centrally dividing the hopper as indicated at 16, one of the end gates 20 may be adjusted as indicated by the dotted lines in Fig. 2, and the other of the end gates adjusted as indicated by the full lines in Fig. 2, such adjustment permitting of a central as well as a lateral discharge.

In reduction to practice, I have found that the form of my invention, illustrated in the drawings, and referred to in the above description, as the preferred embodiment, is the most efficient and practical; yet realizing that the conditions concurrent with the adoption of my device will necessarily vary, I desire to emphasize that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a fertilizer distributer, a wheeled frame, a container for the fertilizer, discharge chutes leading from said container and extending beyond the respective sides of the frame, said chutes having their discharge terminals approximately midway the frame sides, and means operating in each chute to permit either central or lateral discharge of the fertilizer.

2. A fertilizer distributer including a wheeled frame, equipped with a multi-part container, the bottom of each part being independently movable by traction of the frame, a stationary bottom arranged in the path of the outlet ends of said movable bottoms, a partition mounted on said stationary bottom to permit the contents of each part of the container to be independently dispensed, and means mounted on said stationary bottom to permit commingling of the contents of said parts, prior to dispensing said contents.

In testimony whereof I affix my signature in presence of two witnesses.

MAXIE DIXSON TURBEVILLE.

Witnesses:
M. W. MOTLEY,
W. M. SEVERANCE.

Copies of this patent may be obtained for five cents each, by addressing the "Commissioner of Patents, Washington, D. C."